(12) United States Patent
Yu et al.

(10) Patent No.: US 8,798,125 B2
(45) Date of Patent: *Aug. 5, 2014

(54) PHASE TRACKING IN COMMUNICATIONS SYSTEMS

(71) Applicant: Broadcom Corporation, Irvine, CA (US)

(72) Inventors: Tommy Yu, Orange, CA (US); Amy Gayle Hundhausen, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,557

(22) Filed: Aug. 5, 2013

(65) Prior Publication Data

US 2013/0322507 A1    Dec. 5, 2013

Related U.S. Application Data

(63) Continuation of application No. 13/604,423, filed on Sep. 5, 2012, now Pat. No. 8,503,594, which is a continuation of application No. 11/586,668, filed on Oct. 26, 2006, now Pat. No. 8,265,217.

(60) Provisional application No. 60/730,376, filed on Oct. 27, 2005.

(51) Int. Cl.
*H04B 3/46*    (2006.01)

(52) U.S. Cl.
USPC ............ 375/226; 375/371; 375/134; 375/135; 375/136; 375/137; 375/140; 375/142; 375/143; 375/145; 375/146; 375/147; 375/149; 375/150; 375/152; 375/253; 375/306; 375/307; 375/316; 375/326; 375/350; 375/367

(58) Field of Classification Search
USPC ......... 375/226, 371, 134–137, 140, 142–143, 375/145–147, 149–150, 152, 253, 306–307, 375/316, 326, 350, 255, 367
See application file for complete search history.

(56) References Cited

U.S. PATENT DOCUMENTS

| | | |
|---|---|---|
| 3,806,815 A | 4/1974 | Fletcher et al. |
| 5,376,894 A | 12/1994 | Petranovich |
| 5,524,127 A | 6/1996 | Petranovich |
| 5,694,388 A | 12/1997 | Sawahashi et al. |
| 8,265,217 B2 | 9/2012 | Yu et al. |
| 2003/0012270 A1 | 1/2003 | Zhou et al. |
| 2004/0135928 A1 | 7/2004 | Kim |
| 2012/0328064 A1 | 12/2012 | Yu et al. |

*Primary Examiner* — Kabir A Timory

(74) *Attorney, Agent, or Firm* — Sterne, Kessler, Goldstein & Fox P.L.L.C.

(57) ABSTRACT

The present invention includes a method of determining a phase estimate for an input signal having pilot symbols. The method includes receiving a plurality of pilot symbols, and then multiplying two or more pilot symbol slots by corresponding correlator coefficients to correct a phase estimate of the input signal.

20 Claims, 5 Drawing Sheets

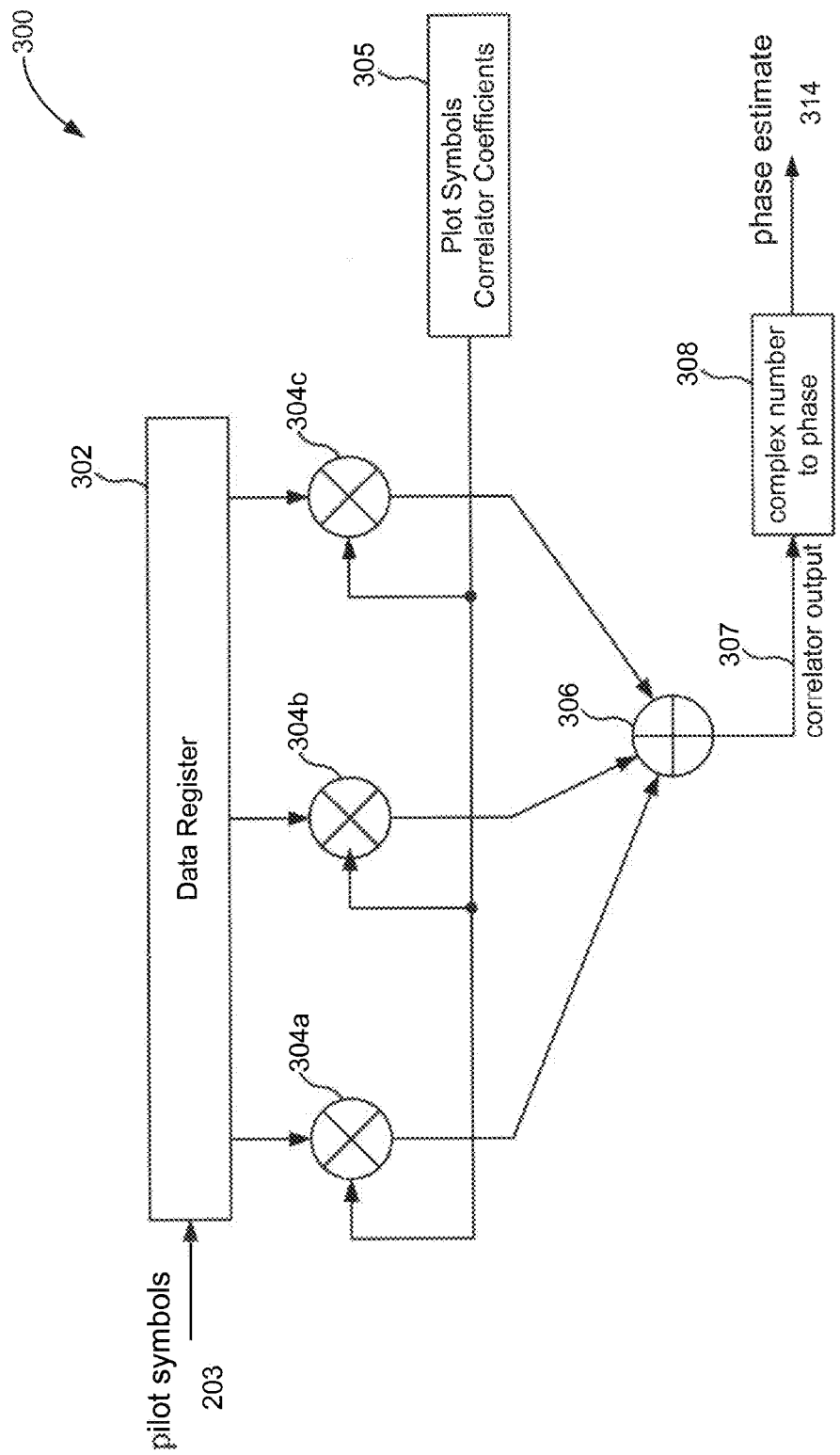
FIG. 3 (conventional)

PHASE TRACKING IN COMMUNICATIONS SYSTEMS

CROSS-REFERENCE TO RELATED APPLICATIONS

This application is a continuation of allowed U.S. application Ser. No. 13/604,423, filed Sep. 5, 2012, which is a continuation of U.S. application Ser. No. 11/586,668, filed Oct. 26, 2006 and issued as U.S. Pat. No. 8,265,217 on Sep. 11, 2012, which claims benefit to U.S. Provisional Application No. 60/730,376, filed Oct. 27, 2005, all of which are incorporated by reference herein in their entirety.

BACKGROUND OF THE INVENTION

1. Field of the Invention

The present invention generally relates to phase tracking in communication systems that use pilot symbols, including for example, satellite communication systems.

2. Background

For a communication system with a very low signal-to-noise ratio (SNR) such as satellite system, known pilot symbols are inserted periodically in the data frame for the purpose of phase tracking. The pilot symbols are used to correct for Doppler effects, as well as phase noise, that cause phase tracking errors between the incoming carrier signal and a local oscillator within the satellite receiver. Specifically, the pilot symbols are used to estimate the phase of the incoming signal (herein called the phase estimate). For example, the phase estimate can be an estimate of the phase delay introduced in the carrier signal by the Doppler effects.

For example, FIG. 1 illustrates a data steam with pilot symbol slots 102*a-d* that are inserted in the data stream where each symbol slot can have one or more pilot symbols. The pilot symbols are used to generate the phase estimates, and the phase estimates are used to align the phase of the incoming signal with the phase of the local oscillator in the digital receiver portion of a satellite receiver. This alignment process is known as phase tracking or phase correction. In order to minimize the overhead for pilot symbols, the number of pilot symbols in each slot is kept as small as possible.

Conventional communication systems use phase estimates that are based on one slot of pilot symbols to adjust the phase of the receiver's local oscillator. However, a problem can occur in low SNR communication systems. In these low SNR systems, phase estimates that are based on one slot of pilot symbols may not be sufficient to accommodate the required system performance.

What is needed, therefore, is an apparatus and method of determining the phase estimate of the incoming data signal using multiple pilot symbol slots and then using those phase estimates for the purpose of phase tracking

BRIEF SUMMARY OF THE INVENTION

The present invention includes a method of determining a phase estimate for an input signal having pilot symbols. The method includes receiving a plurality of pilot symbols, and then multiplying two or more adjacent pilot symbol slots by corresponding correlator coefficients to produce a plurality of correlator outputs that are combined to produce phase estimate of the input signal.

The present invention provides a technique for providing phase estimations that use pilot symbols from multiple slots, spaced apart to achieve a better estimate than those of prior art systems that use only one slot. More specifically, the present invention considers one or more adjacent (e.g., neighboring) pilot symbol slots to perform the phase estimation that is used for phase tracking. Traditional systems, as noted above, typically use only one slot of pilot symbols to perform the phase estimation that is used for the phase tracking. By considering one or more neighboring pilot symbol slots, the present invention decreases the phase estimation variance in communication systems where the SNR is severely compromised, thereby enhancing the system's phase tracking capabilities.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 is a block diagram illustration of a conventional phase estimator based on the determination of a phase estimate using one pilot symbol slot.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

Figure 1:
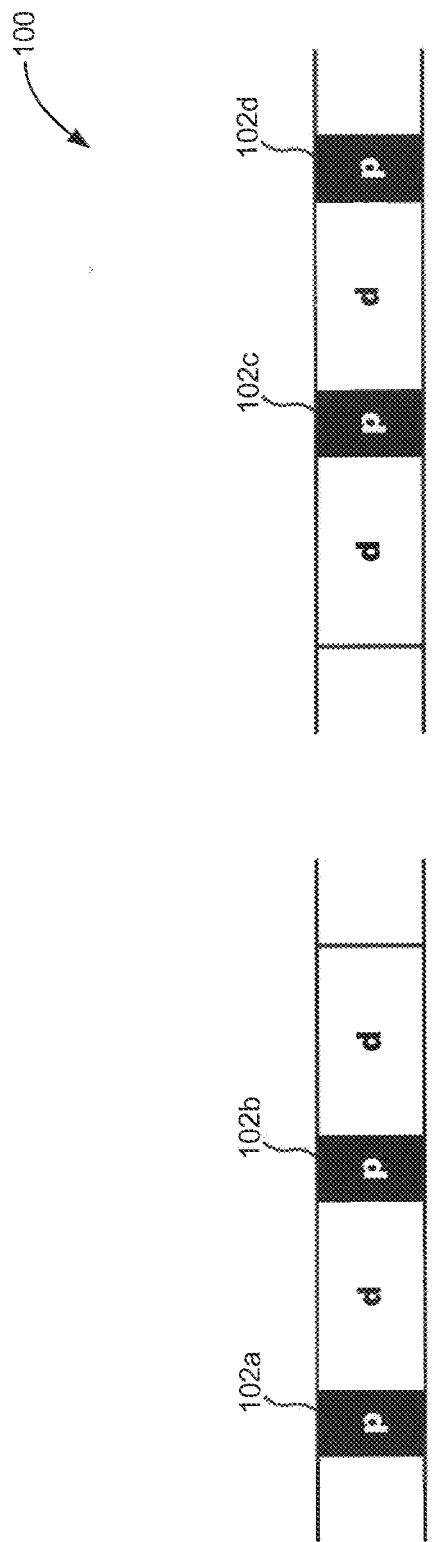
FIG. 1 is an illustration of a data stream having pilot symbols embedded therein.

FIG. 1 is a block diagram illustration of a data stream 100 in the time domain having embedded pilot symbol slots 102(*a-d*) to provide for phase estimation and correction of phase noise. Each slot consists of one or more known symbols, also known as pilot symbols. Segments (d) within the data stream 100 are representative of payload data. In the exemplary embodiment of FIG. 1, a spacing between pilot symbol slots, for example, between the symbols 102(*a*) and 102(*b*) is 1440 symbols. However, other systems could use other spacing values that would also be within the spirit and scope of the present invention.

Figure 2:
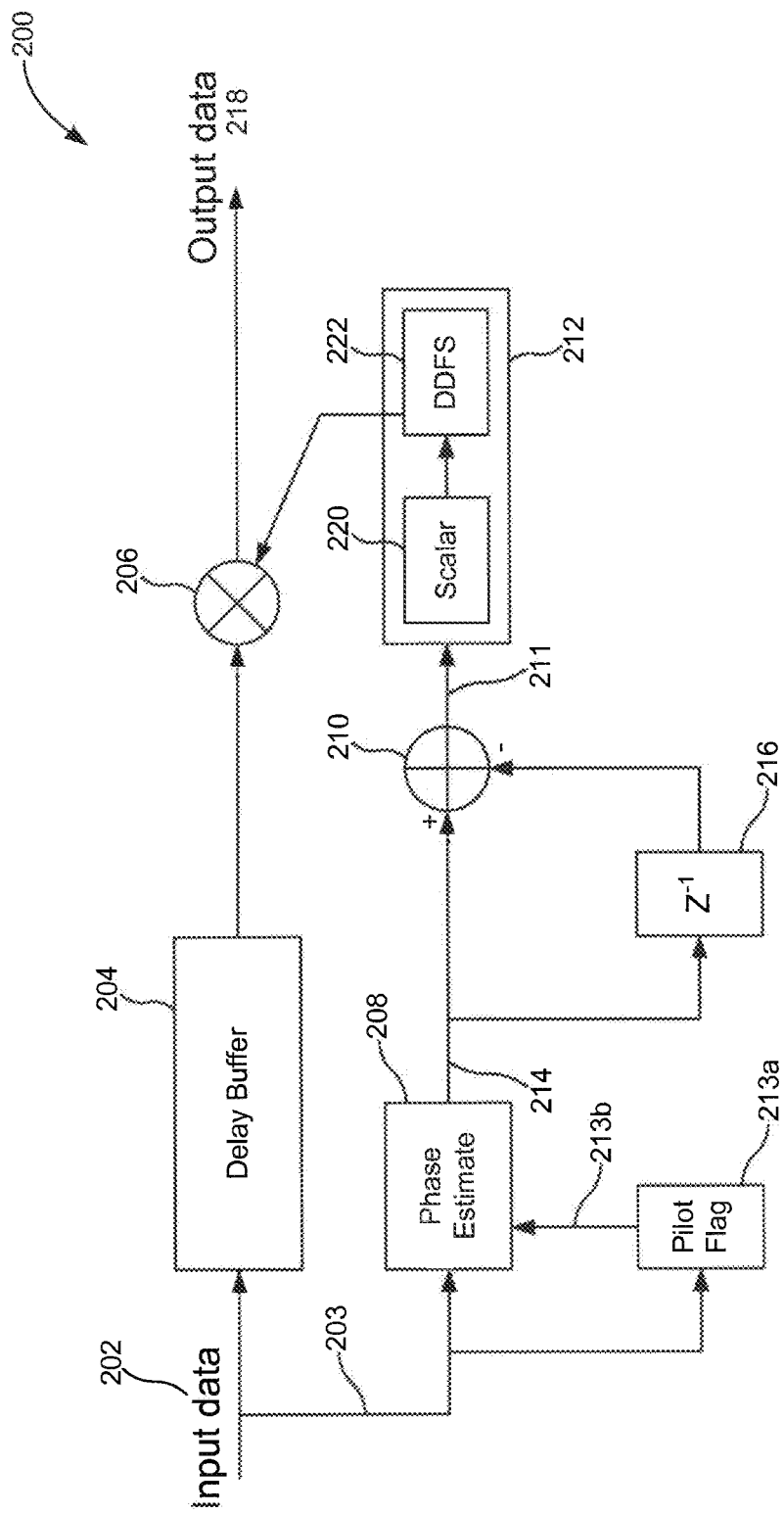
FIG. 2 is a block diagram illustration of a phase estimation and tracking system that receives incoming data, phase corrects the incoming data, and produces output data in accordance with the present invention.

FIG. 2 is a block diagram illustration of an architecture of a phase estimation and correction system 200 that uses pilot symbols to provide phase estimates. Stated another way, the tracking scheme of the system 200 is used to align the phase of the incoming data with the local oscillator phase in the satellite receiver. The system 200 receives an incoming input data stream 202, phase corrects the incoming data, and produces output data 218. The system 200 includes a delay buffer 204, a multiplier 206, a phase estimate module 208, a summer 210, a processing module 212, a delay 216, and a pilot flag module 213a.

In FIG. 2, the pilot flag module 213a produces an enable phase estimate signal 213b to enable the phase estimate module 208. The pilot enable signal 213b is generated when the pilot flag module 213a senses the presence of a pilot symbol slot within the input data stream 202, such as any one of the pilot symbol slots 102 (a-d), shown in FIG. 1. That is, the phase estimate module 208 is only activated to estimate phase when the module 208 is triggered by the enable 213b. The phase estimate module 208 generates a current phase estimate 214 that is used to align the input data stream 202 with the phase of the local oscillator.

During operation of the system 200, the input data stream 202 is stored in the delay buffer 204. The pilot symbols within the slots 102 (a-d) are stripped from the input data stream 202 and forwarded as a pilot symbol signal 203 to the phase estimate module 208, to produce the current phase estimate 214 as an output.

After the phase of the pilot symbol signal 203 is estimated within the phase estimate module 208, the current phase estimate value 214 is output from the phase estimate module 208. For example, the phase can be estimated for the pilot symbol slot 102(b) of the data stream 100. A previous phase estimate value (e.g., previous phase estimate for the pilot symbol slot 102(a)), is stored within the delay module 216. The previous phase estimate value for 102(a) is then compared with the current phase estimate value 214 (representative of the phase of 102(b)) within the summer 210 to produce a difference phase estimate value 211.

The difference phase estimate value 211, which represents a phase difference between the pilot symbol slots 102(a) and 102(b), is later shaped as a linear phase ramp. This ramp is then converted to a complex sinusoidal value that is applied to the data stored within the delay buffer 204. This aspect of the present invention is discussed in greater detail below.

The processing module 212 is configured to produce a complex sinusoidal signal that is based on a linear phase ramp. The complex sinusoidal signal is applied to the data output from the delay buffer 204. The processing module 212 includes a scalar 220 and a digital direct frequency synthesizer (DDFS) module 222. The scalar 220 divides the difference phase estimate value 211 by the number of data symbols (e.g., 1440 symbols), between the pilot symbols 102(a) and 102(b). The DDFS 222 then produces the linear phase ramp based on the divided difference phase estimate. The ramp start and end points correspond to the phase estimate values for pilot symbol slots 102(a) and 102(b), respectively The linear phase ramp is produced based upon an output from the scalar 220 in accordance with techniques well known to those of skill in the art.

The linear phase ramp is produced by the DDFS 222, which then converts the phase ramp to a complex sinusoidal value. More specifically, the real part of the DDFS output corresponds to the sine of the phase ramp, and the imaginary part of the DDFS output corresponds to the cosine of the phase ramp. The output from the DDFS 222 is then used to correct the phase of the input data stream 202 that is stored within the delay buffer 204. More specifically, the DDFS outputs are multiplied with the output from the delay buffer 204 to produce phase corrected output data 218. In this manner, a phase correction is applied to data from the data stream 100 that lies between the pilot symbol slots 102(a) and 102(b), using phase estimates based on the pilot symbol slots 102(a) and 102(b).

FIG. 3 illustrates a conventional phase estimator 300 configured to produce a phase estimate 314. The conventional phase estimator 300 includes a data register 302, multipliers 304a-c, a pilot symbol correlator coefficient generator 305, and a complex number to phase conversion unit 308.

During operation, the pilot symbols 203 are shifted into the data register 302. In the phase estimator 300, the number of multipliers within the data register 302 corresponds to the number of pilot symbols within the data stream 100. The multipliers 304 multiply corresponding pilot data by pilot symbol coefficients that are generated by the correlator coefficient generator 305, to retrieve the actual pilot symbol data. By way of example, the coefficients can be conjugates of the corresponding pilot symbols.

The resulting outputs from the multipliers 304a-c are added together using the adder 306 to produce a correlator output signal 307. The correlator output signal 307 is processed by the complex number to phase conversion unit 308 to convert the correlator output signal 307 to a phase, which is the phase estimate 314.

The phase estimate is calculated using a coherent correlator followed by a complex number to phase conversion unit, as shown in FIG. 3. Given a sequence of pilot symbols P, the correlator coefficient vector C can be expressed as follows:

$$P = \{e^{j\phi_0}, e^{j\phi_1}, e^{j\phi_2}, e^{j\phi_3}, \ldots\}$$

$$C = \{e^{-j\phi_0}, e^{-j\phi_1}, e^{-j\phi_2}, e^{-j\phi_3}, \ldots\}$$

Figure 4:
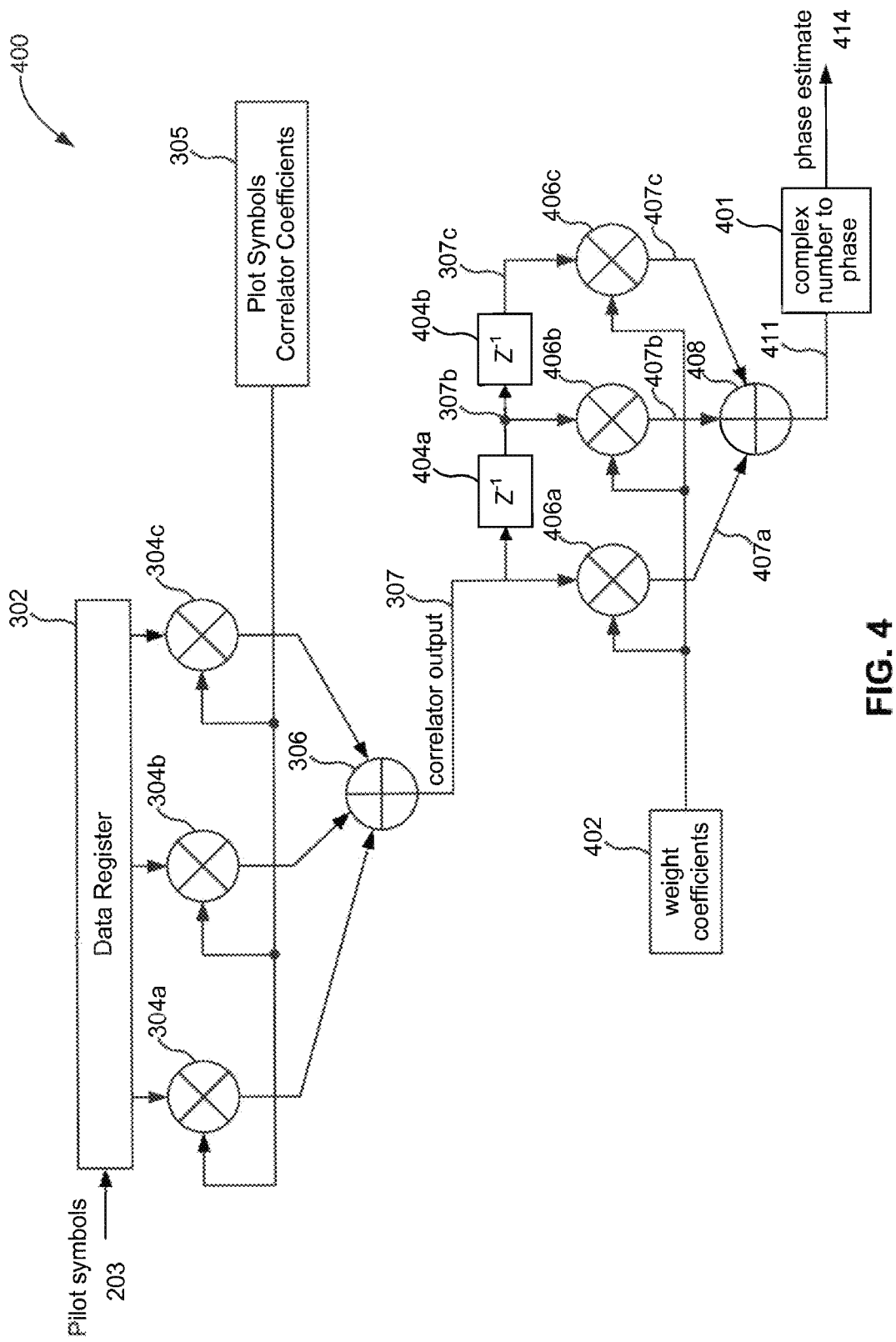
FIG. 4 is a block diagram illustration of a phase estimator that weights phase estimates from multiple pilot symbol slots over time according to embodiments of the invention.

The phase estimate variance is limited by the number of symbols in a pilot slot. Since the estimate variance determines the overall receiver performance, it is desirable to make the phase estimate variance smaller. A smaller phase estimate variance can be achieved using longer pilot slots, but that costs system bandwidth. On the other hand, the phase change in a receiver is gradual when the system is locked. Using this property, a weighted function can be used to smooth out the current phase estimate. An implementation of this weighted phase estimate is shown in FIG. 4. In the implementation of FIG. 4, an earlier phase estimate and a later phase estimate are used. This architecture can reduce the estimation variance by a factor of three.

In general, the variance of phase estimates in pilot symbol based communication systems, such as the estimator 300, is dependent on the number of symbols used to generate the estimate. The phase estimate 314 is only based on one pilot symbol slot, using 36 symbols. Since the system 300, which does not have the ability to change the number of symbols in a pilot symbol slot, uses only one pilot symbol slot to create its estimate, it may not be robust enough in a high noise environment. A greater number of symbols (e.g., 72, 108, of higher) would provide an estimate with lower variance, which would ultimately translate to output payload data with a high signal to noise ratio.

FIG. 4 is a block diagram illustration of a phase estimator 400 constructed in accordance with an embodiment of the present invention. The phase estimator 400 of FIG. 4 weighs two or more phase estimates over time in order to improve the phase estimate in a noisy environment. Based upon simulations and test measurements illustrating that a greater numbers of pilot symbols reduces the phase estimation variance, the phase estimator 400 is configured to change the number of symbols used in the estimate. So, for example, instead of being restricted to using only the current pilot symbol slot to create the estimate, neighboring pilot symbol slots can also be used.

Phase estimator 400 includes the data register 302, the multipliers 304, the coefficient generator 305, and the adder 306. However, the phase estimator 400 also includes a weight coefficient generator 402, delays 404a and 404b, multipliers 406a-c, the adder 408, and a complex number to phase converter 401. Note that there could be more than two delays 404 depending the number of phase estimates that are averaged, which is determined by the specific embodiment.

In addition to the functions discussed above for the phase estimator 300, the phase estimator 400 also weights and averages one or more phase estimates over time (past, present, and future). The correlator output 307 is delayed by first and second delays 404a and 404b. Accordingly, the multipliers 406a-c process a past, a present, and a future correlator output 307. By doing so, the phase estimator 400 averages past, present, and future phase estimates to produce a final phase estimate 414, where the average is performed in a weighted fashion.

Specifically, the multiplier 406a multiplies the correlator output 307 by a first weighting coefficient, to produce a first weighted correlator output 407a. The weight coefficient generator 402 produces a set of weighting coefficients based upon user calculations. That is, the coefficients are pre-calculated based upon characteristics of the communication system.

The multiplier 406b multiplies the correlator output 307b by a second weighting coefficient, to produce a second correlator output 407b. The multiplier 406c multiplies the correlator output 307c by a third weighting coefficient, to produce a third correlator output 407c. The weighted correlator outputs 407a-c are summed by the adder 408, to produce a combined correlator output 411. The complex number to phase converter 401 converts the combined correlator output 411 to a phase, which provides the weighted phase estimate output 414 that is used for the phase estimate 214 in FIG. 2.

Note that any number of correlator outputs 307 can be weighted and averaged. Thus, the present invention is not limited to three as shown.

Regarding the weighting coefficients, in a slow moving channel, an equal weighting can be used: ⅓ (past), ⅓ (present), ⅓ (future). In one embodiment, a weighting of ¼ (past), ½ (present), ¼ (future).

Figure 5:
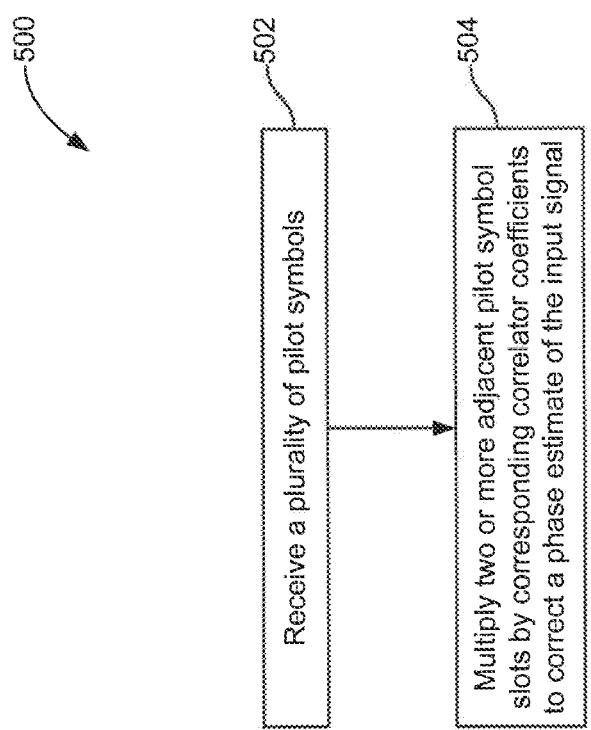
FIG. 5 is a flow chart of an exemplary method of practicing an embodiment of the present invention.

FIG. 5 is a flow chart of an exemplary method 500 of practicing an embodiment of the present invention. In the method 500, a plurality of pilot symbol slots is received in a step 502. In step 504, two or more adjacent pilot symbol slots are multiplied by corresponding correlator coefficients to produce a plurality of correlator outputs to correct a phase estimate of the input signal. The plurality of correlator outputs are averaged. The result of the averaging is then converted from a complex representation to a phase representation.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method comprising:
receiving a first set of pilot symbols and a second set of pilot symbols in a data stream, wherein the data stream comprises data symbols positioned between the first set of pilot symbols and the second set of pilot symbols, and wherein the first set of pilot symbols and the second set of pilot symbols each comprise one or more pilot symbols;
generating a first phase estimate and a second phase estimate based on the first set of pilot symbols and the second set of pilot symbols respectively;
determining a phase difference between the second phase estimate and the first phase estimate; and
correcting phases associated with the data symbols in the data stream based on the phase difference, wherein correcting phases associated with the data symbols includes:
generating a phase ramp signal representative of respective beginning and ending points associated with the first set of pilot symbols and the second set of pilot symbols;
converting the phase ramp signal to a complex sinusoidal value; and
multiplying the complex sinusoidal value with the data symbols to correct phases of the data symbols,
wherein the receiving, generating, determining and correcting are performed by one or more circuits.

2. The method of claim 1, wherein determining the phase difference includes:
delaying the first phase estimate by a delay unit to form a delayed first phase estimate; and
subtracting the delayed first phase estimate from the second phase estimate to form the phase difference.

3. The method of claim 1, wherein generating the first phase estimate includes:
forming a first correlator output by multiplying the first set of pilot symbols with respective pilot symbol coefficients;
forming a second correlator output by multiplying the second set of pilot symbols with respective pilot symbol coefficients;
delaying the first correlator output by a delay unit to output a delayed first correlator output; and
forming a weighted sum of the delayed first correlator output and the second correlator output to generate the first phase estimate.

4. The method of claim 3, wherein forming the weighted sum of the delayed first correlator output and the second correlator output includes:
multiplying the delayed first correlator output and the second correlator output with a first weighting coefficient and a second weighting coefficient respectively.

5. The method of claim 4, wherein the first weighting coefficient and the second weighting coefficient are precalculated based on characteristics of a communication system that uses the data stream.

6. The method of claim 3, wherein the pilot symbol coefficients comprise conjugates of corresponding pilot symbols.

7. The method of claim 1, wherein correcting phases of the data symbols includes:
forming a complex sinusoid using a scalar value and a direct digital frequency synthesizer.

8. The method of claim 7, wherein the scalar value is derived from a number of the data symbols.

9. The method of claim 1, wherein the first weighting coefficient and the second weighting coefficient are precalculated based on characteristics of a channel associated with a communication system that uses the data stream.

10. A method comprising:
receiving first set of pilot symbols and a second set of pilot symbols in a data stream, wherein the data stream comprises data symbols positioned between the first set of pilot symbols and the second set of pilot symbols, and wherein the first set of pilot symbols and the second set of pilot symbols each comprise one or more pilot symbols;
generating a first phase estimate and a second phase estimate based on the first set of pilot symbols and the second set of pilot symbols respectively, where generating the first phase estimate and the second phase estimate includes being triggered based on sensing a presence of the first set of pilot symbols and the second set of pilot symbols respectively;
determining a phase difference between the second phase estimate and the first phase estimate; and
correcting phases associated with the data symbols in the data stream based on the phase difference,
wherein the receiving, generating, determining and correcting are performed by one or more circuits.

11. A system comprising:
one or more circuits configured to:
receive a first set of pilot symbols and a second set of pilot symbols in a data stream, wherein the data stream comprises data symbols positioned between the first set of pilot symbols and the second set of pilot symbols, and wherein the first set of pilot symbols and the second set of pilot symbols each comprise one or more pilot symbols;
generate a first phase estimate and a second phase estimate based on the first set of pilot symbols and the second set of pilot symbols respectively;
determine a phase difference between the second phase estimate and the first phase estimate; and
correct phases associated with the data symbols in the data stream based on the phase difference, wherein the one or more circuits are further configured to correct phases associated with the data symbols by:
generating a phase ramp signal representative of respective beginning and ending points associated with the first set of pilot symbols and the second set of pilot symbols;
converting the phase ramp signal to a complex sinusoidal value; and
multiplying the complex sinusoidal value with the data symbols to correct the phases associated with the data symbols.

12. The system of claim 11, wherein the one or more circuits are farther configured to determine the phase difference by:
delaying the first phase estimate by a delay unit to form a delayed first phase estimate; and
subtracting the delayed first phase estimate from the second phase estimate to form the phase difference.

13. The system of claim 11, wherein the one or more circuits are further configured to generate the first phase estimate by:
forming a first correlator output by multiplying the first set of pilot symbols with respective pilot symbol coefficients;
forming a second correlator output by multiplying the second set of pilot symbols with respective pilot symbol coefficients;
delaying the first correlator output by a delay unit to output a delayed first correlator output; and
forming a weighted sum of the delayed first correlator output and the second correlator output to generate the first phase estimate.

14. The system of claim 13, wherein the one or more circuits are further configured to form the weighted sum of the delayed first correlator output and the second correlator output by:
multiplying the delayed first correlator output and the second correlator output with a first weighting coefficient and a second weighting coefficient respectively.

15. The system of claim 14, wherein the first weighting coefficient and the second weighting coefficient are precalculated based on characteristics of a communication system that uses the data stream.

16. The system of claim 13, wherein the pilot symbol coefficients comprise conjugates of corresponding pilot symbols.

17. The system of claim 11, wherein the one or more circuits are further configured to correct the phases associated with the data symbols by:
forming a complex sinusoid using a scalar value and a direct digital frequency synthesizer.

18. The system of claim 17, wherein the scalar value is derived from a number of the data symbols.

19. The system of claim 11, wherein the first weighting coefficient and the second weighting coefficient are precalculated based on characteristics of a channel associated with a communication system that uses the data stream.

20. A system comprising:
one or more circuits configured to:
receive a first set of pilot symbols and a second set of pilot symbols in a data stream, wherein the data stream comprises data symbols positioned between the first set of pilot symbols and the second set of pilot symbols, and wherein the first set of pilot symbols and the second set of pilot symbols each comprise one or more pilot symbols;
generate a first phase estimate and a second phase estimate based on the first set of pilot symbols and the second set of pilot symbols respectively;
determine a phase difference between the second phase estimate and the first phase estimate; and
correct phases associated with the data symbols in the data stream based on the phase difference,
wherein the one or more circuits are further configured to generate the first phase estimate and the second phase estimate by being triggered based on sensing a presence of the first set of pilot symbols and the second set of pilot symbols respectively.

* * * * *

UNITED STATES PATENT AND TRADEMARK OFFICE
CERTIFICATE OF CORRECTION

| | | |
|---|---|---|
| PATENT NO. | : 8,798,125 B2 | Page 1 of 1 |
| APPLICATION NO. | : 13/959557 | |
| DATED | : August 5, 2014 | |
| INVENTOR(S) | : Yu et al. | |

It is certified that error appears in the above-identified patent and that said Letters Patent is hereby corrected as shown below:

In the Claims

Column 7, line 56, please replace "circuits are farther configured" with --circuits are further configured--.

Signed and Sealed this
Fourteenth Day of October, 2014

Michelle K. Lee
*Deputy Director of the United States Patent and Trademark Office*